United States Patent [19]

Murillo

[11] 4,350,470
[45] Sep. 21, 1982

[54] WHEEL TRUCK

[76] Inventor: Hernando Murillo, Calle 82 No. 14-A-17 Piso 4°, Bogotá, Colombia

[21] Appl. No.: 157,606

[22] Filed: Jun. 9, 1980

[51] Int. Cl.³ ............................................. B60B 29/00
[52] U.S. Cl. ............................. 414/430; 280/79.1 A
[58] Field of Search ............................. 414/430, 537; 280/79.1 A, 79.1 R

[56] References Cited

U.S. PATENT DOCUMENTS

| | | | |
|---|---|---|---|
| 883,122 | 8/1907 | Weber | 414/430 |
| 2,414,383 | 1/1947 | Merriam | 414/430 |
| 2,491,318 | 12/1949 | Knapp | 414/430 |
| 2,607,607 | 8/1952 | Day | 414/430 |
| 2,608,312 | 8/1952 | Day | 414/430 |
| 2,610,750 | 9/1952 | Hulbert | 414/430 |
| 3,145,860 | 8/1964 | Graves | 414/430 |
| 3,224,611 | 12/1965 | Smuck | 414/430 |

*Primary Examiner*—Robert R. Song
*Attorney, Agent, or Firm*—Pollock, Vande Sande & Priddy

[57] ABSTRACT

A small, compact, collapsible three-wheeled truck which can be used to support a flat or damaged tire of a vehicle while the latter is being driven to a repair location. The truck has a foldable ramp which rests flat on the ground while the rear wheels are in slightly raised position, so as to prevent movement of the truck while the flat tire is being driven onto it. As the ramp pivots upwardly into retaining position behind the tire, the rear wheels are lowered into ground contacting position. Simultaneously, an extension attached to the ramp causes a retaining member near the front of the truck to pivot upwardly out of the way of the tire into front retaining position. The tire after mounting rests in a cradle and is prevented from moving forwardly or rearwardly with respect to the truck.

11 Claims, 6 Drawing Figures

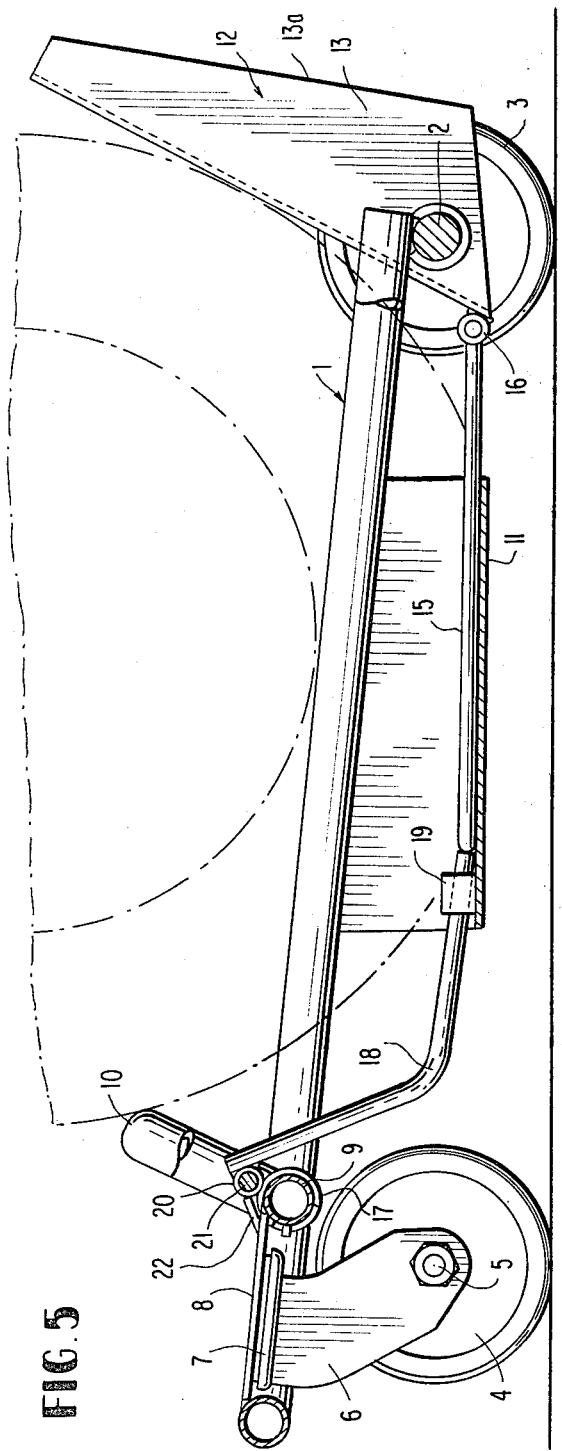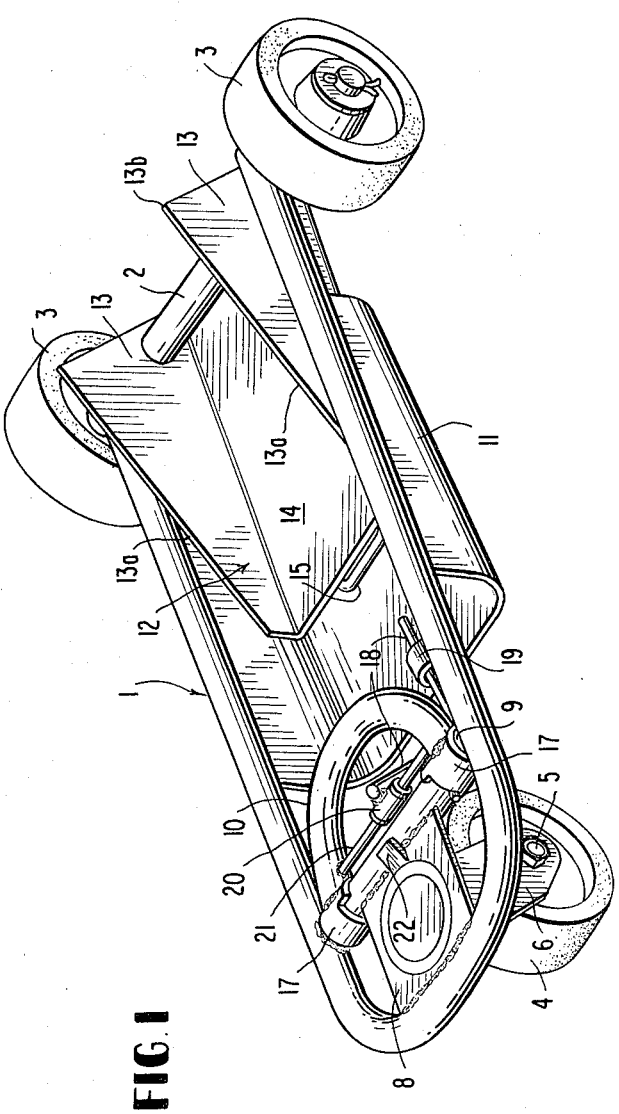

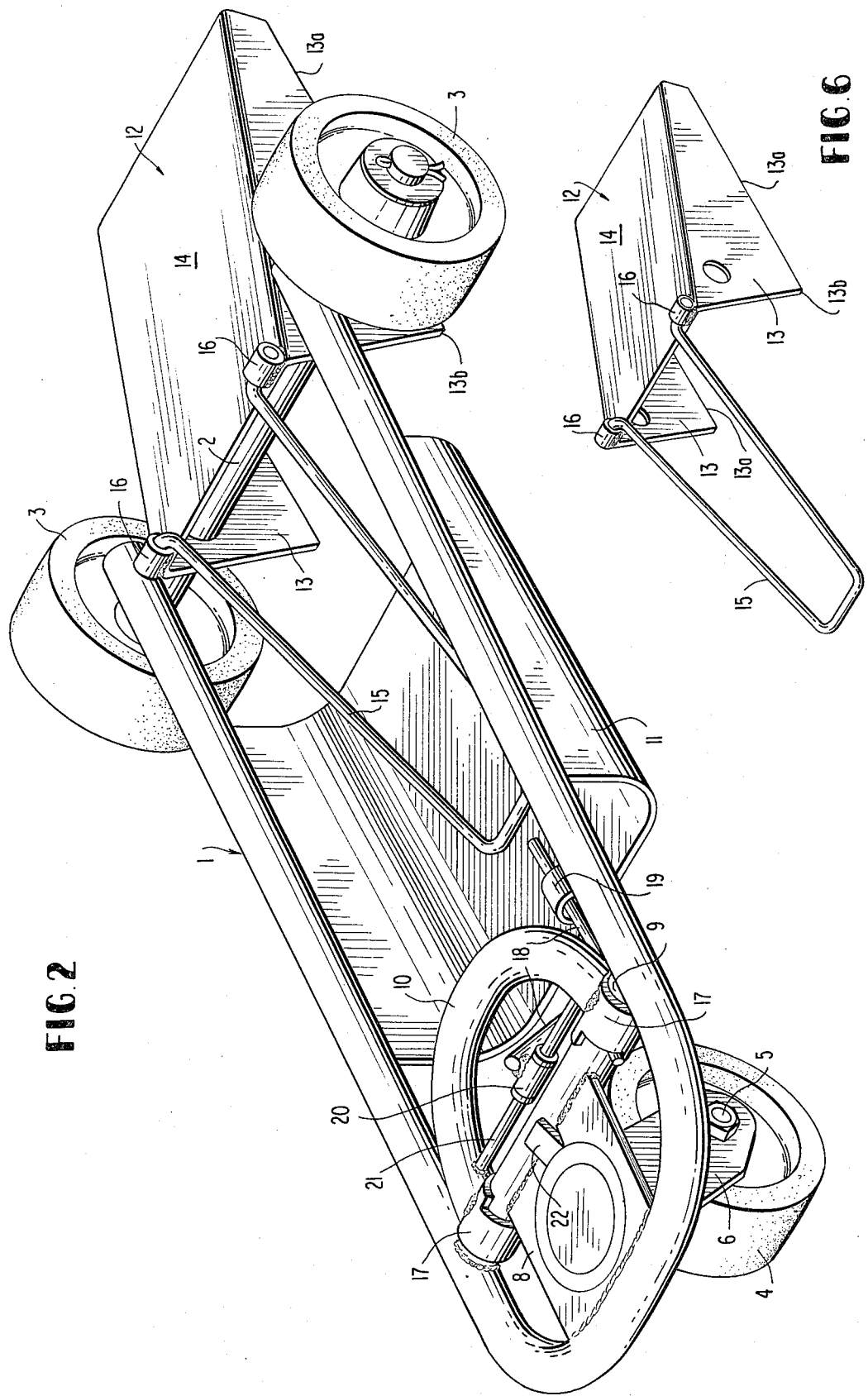

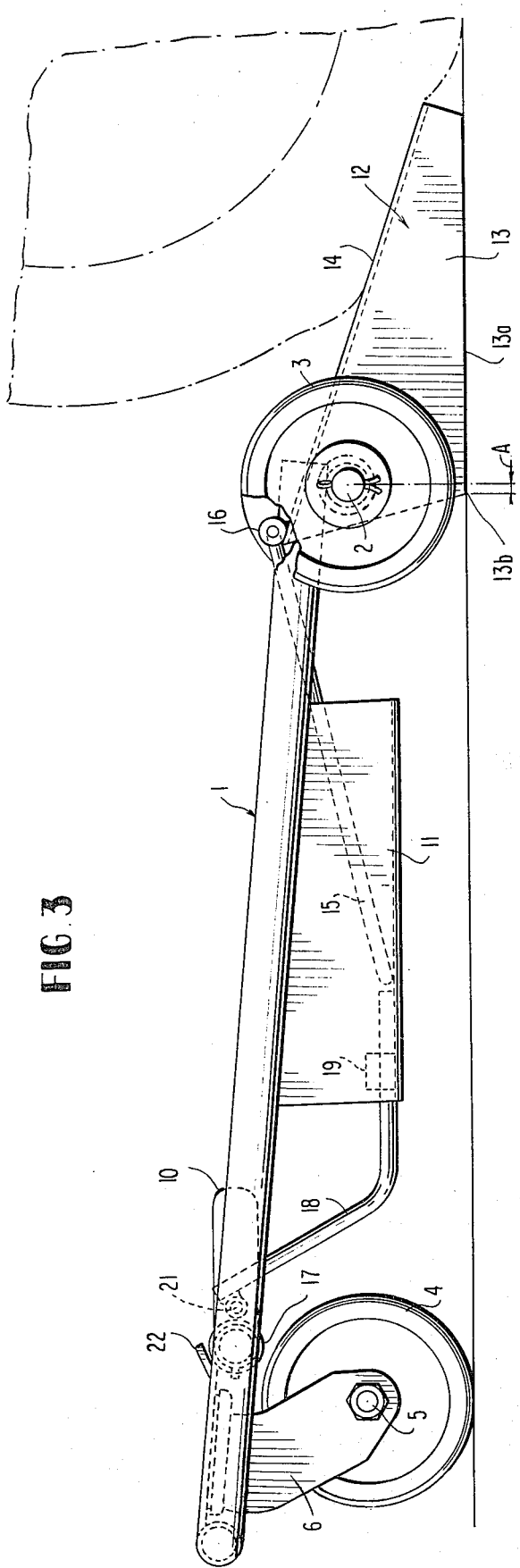
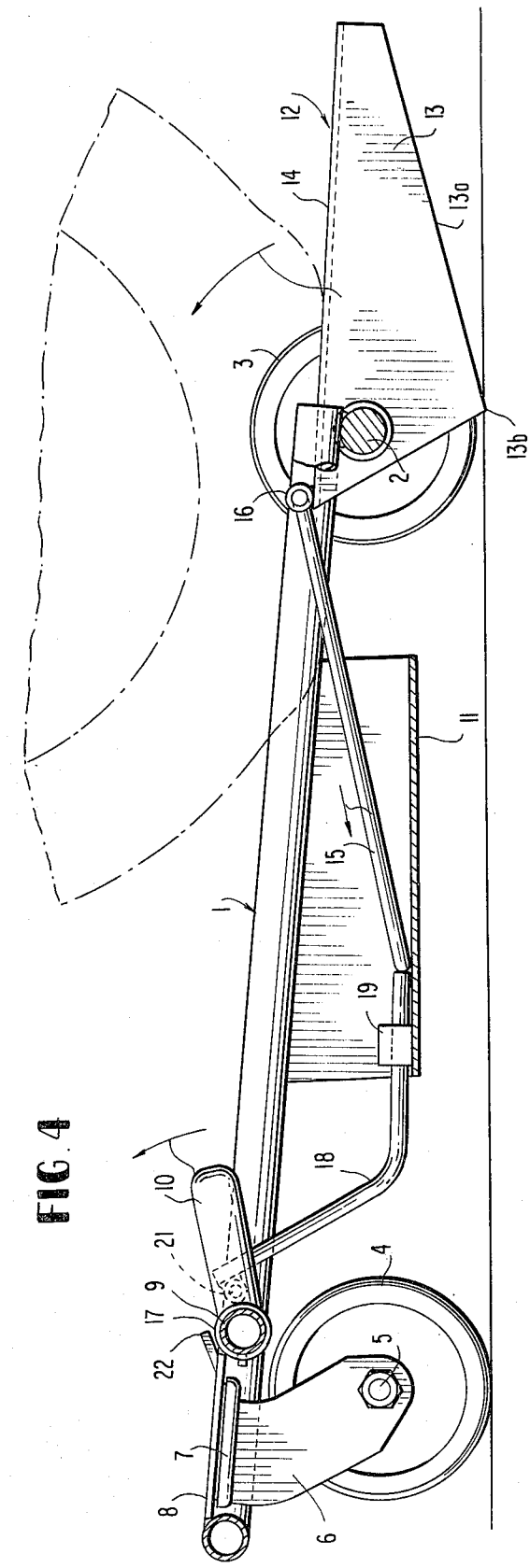

WHEEL TRUCK

SUMMARY OF THE INVENTION

The invention relates to a compact three-wheeled truck for use with vehicles having a flat or damaged tire. The tire is driven directly onto the truck ramp whose structure secures it against forward movement. Once the tire rests securely in a cradle on the truck, the ramp automatically pivots upwardly to a tire-retaining position. When not in use, the ramp can be folded over into the cradle to permit storing of the truck in the trunk of the vehicle.

BACKGROUND OF THE INVENTION

The need for a self-help device which makes it possible to operate a vehicle with a flat or damaged tire without the need to change that tire is self-evident. Flat tires are a common occurrence. Even under the best of circumstances, their replacement is a cumbersome and dirty job. When the flat tire must be changed under conditions of darkness, in rain or snow, on the narrow shoulder of an express highway, on sloping terrain, or under any one of a number of other adverse conditions, the job becomes extremely unpleasant and frequently even dangerous.

It is also a fact that many cars are driven by women, in some cases elderly women, who find the mere mechanical task of changing a tire quite beyond their capacities. Women are also reluctant to engage in this particular task because it graphically displays their momentary helplessness to every passing motorist. In remote locations, and particularly at night, this represents a particular danger.

The need for such a device is particularly critical when the tire must be replaced in the middle of a busy lane for lack of shoulders on the road or impossibility of moving the car without ruining the flat tire. In such instances, heavy traffic flow may be completely stalled for a long period of time while the damaged wheel is changed, causing not only great inconvenience, but also air pollution and wastage of fuel.

To meet this need, many proposals have been made to provide a wheeled dolly or other support device onto which the flat tire can be driven, and which then enables the motorist to drive the vehicle to the nearest auto service station.

Support devices of this type normally have two rear wheels and one or two front wheels, the single front wheel usually being a caster wheel. The wheels are attached to a horizontal frame which contains a cradle in which the disabled tire can rest securely. In addition, the rear portion of the support device normally has a ramp which is pivotable from a first position in which it contacts the ground to a second, raised position to which it is pivoted by the wheel being mounted on the support member.

Support devices of the foregoing type are shown, e.g., in U.S. Pat. No. 2,350,118 (Knapp) and U.S. Pat. No. 3,145,860 (Graves). However, these prior art devices (and others mentioned hereinbelow) have a number of serious disadvantages which applicant has been able to overcome.

The Knapp patent discloses a three-wheeled truck comprising a single front caster wheel and a longitudinally extending strip which serves as a cradle for the wheel to be mounted. However, for the purpose of holding the truck stationary under the forward pressure of an entering wheel, the patentee mounts two stay pins for pivotal movement on the rear wheel axle. Each stay pin has a radius greater than that of the rear wheels, and engages the ground with a sharp knife edge, so that the wheels are elevated off the ground while the truck is in wheel receiving position. As the wheel is driven onto the ramp, the stay pins are driven into the ground by the weight of the wheel, thereby preventing the truck from moving forward. As the wheel moves forward towards the cradle, the rear wheel axle moves forwardly of the fixed fulcrum of the stay pins, causing these to swing rearwardly into dragging position, and the rear wheels drop to truck supporting position in contact with the ground. Detents integral with the ramp engage with lugs projecting from the stay pins to assure that pivoting of the ramp does not occur until the damaged tire has passed the axle of the rear wheels.

It will be clear from the foregoing discussion that, while Knapp indeed assures that the truck does not move forward during loading, he achieves this objective by extremely cumbersome means. The provision of stay pins with knife edges makes the truck heavy and unwieldy, and it is questionable how well the pins could "dig" into, e.g., the concrete pavement of a highway, or to what extent they would damage a non-concrete pavement, such as asphalt. Moreover, the stay pins would have to be extremely sturdy in order to withstand the considerable stress to which they are subjected during their movement from their forward, dug-in position to their rearward, dragging position. Another disadvantage resides in the fact that, for the entire subsequent travel of the vehicle, the pins would presumably drag along the pavement, causing both drag on the vehicle and damage to the pins themselves and to the pavement.

The Graves patent discloses a truck having a two-part ramp movable from an inclined position to a horizontal position. The device is rather complex. In the first place, it is only partly collapsible, by folding the rear ramp portion over the front ramp portion. Since each of these portions is also provided with integral half tube supports, the truck in its collapsed position can be regarded as compact only in terms of its limited size, which appears to limit its stability and carrying capacity correspondingly.

To keep the truck from rolling while the ramp is receiving the tire, Graves provides a plunger mechanism for locking the truck wheels in place. As the tire reaches the end of the ramp, the latter pivots to its horizontal position, causing it to press down on the plunger mechanism, thereby releasing the wheels. This arrangement is complicated and hence uneconomical, by contrast with the present invention which achieves the same result while using an extremely simple, rationalized structure.

While the Knapp patent does not provide any means of securing the tire once mounted, Graves does so by complicated means which will be compared hereinbelow with the simple mechanism conceived by applicant.

BRIEF INTRODUCTION TO THE DRAWINGS

In order that the invention may be more clearly understood, it will now be described in detail with reference to the accompanying drawings, wherein a preferred embodimemt of the invention is shown for purposes of illustration, and wherein:

FIG. 1 is a perspective view of the truck in its fully collapsed position;

FIG. 2 is a perspective view of the truck in its fully extended position;

FIG. 3 is a side elevation showing the relative positions of the ramp and rear wheels of the truck at the start of mounting of a tire;

FIG. 4 is a side elevation similar to FIG. 3, partly in section, showing an intermediate stage of mounting the tire;

FIG. 5 is a side elevation similar to FIGS. 3 and 4, partly in section, showing the positions of the ramp and rear wheels when the tire is fully mounted on the truck; and FIG. 6 is a perspective view of the ramp member.

DESCRIPTION OF A PREFERRED EMBODIMENT

The wheel truck according to the invention comprises a U-shaped frame 1, preferably of tubular metal, the open end of the U being closed by a crosspiece 2 attached immediately below the ends of the legs of the U, for example by welding. This crosspiece also serves as the axle for the two rear wheels 3.

The single front wheel 4 is a caster wheel mounted on an axle 5 passing through apertures in the two cheeks of a yoke 6 depending from a pivoting circular plate 7 attached to the underside of a plate 8 integral with the U-shaped frame and extending from the closed end of the U to a second crosspiece 9 extending transversely between the legs of the U at a distance of a few inches from said closed end.

This second crosspiece 9 not only assists in supporting the plate which carries front wheel 4, but also serves as a pivot axis for a generally U-shaped member 10 whose function will be described hereinbelow.

Attached to the respective legs of U-shaped frame 1, between the aforementioned crosspieces 2 and 9, is a cradle 11 for the wheel to be carried by the truck. Cradle 11 may comprise a solid, generally U-shaped member, whose open end is in substantially the same horizontal plane as frame 1 itself. Alternatively, it may comprise two or more U-shaped ribs, which may be connected by stiffening members. A solid type of member has the advantage of greater strength, while a ribbed member will result in a lighter structure. A combination of solid and ribbed members, as well as other kinds of support, would obviously be within the scope of the present invention.

Pivotally mounted on crosspiece 2 extending between the rear wheels of the truck is a ramp 12 comprising two vertical side walls 13 of substantially scalene triangular shape, whose longest edges are at the top in the mounting position of the ramp, and are connected by a rectangular top piece 14 whose longer sides extend in the longitudinal direction of the truck, and which may be ribbed or perforated to save weight.

Crosspiece 2 passes through apertures in sidewalls 13 of ramp 12 at a distance from edges 13a of the sidewalls slightly greater than the radius of rear wheels 3.

While ramp 12 is in its extended position preparatory to loading of a tire, edges 13a of side walls 13 of ramp 12 are flat on the ground, and rear wheels 3 are slightly elevated due to the difference between their radius and the distance of their axle from the ground. This results in firm resistance of the ramp and truck against forward movement which would otherwise result when the flat wheel is driven onto the truck.

In order to further improve the anti-skid quality of ramp member 12, rubber stripping may be glued or otherwise attached to edges 13a contacting the ground when ramp 12 is in its loading position.

Hinged to ramp 12 is a generally tapered U-shaped rod 15 having outwardly turned ends which are rotatable in small bushings 16 integral with ramp 12 and located at both sides of the leading edge of the ramp. The closed end portion of U-shaped rod 15 has a width of several inches and extends transversely of the truck. In normal position, prior to loading of a wheel, U-shaped rod 15 hangs from bushings 16, its closed end portion resting in cradle 11.

When a wheel is driven onto ramp 12, the latter pivots about corners 13b of its side walls 13 as the weight of the tire shifts from the rear to the front portion of ramp 12, reaching the position shown in FIG. 5, with the longest edges of side walls 13 extending upwardly in a rearward direction, and their shorter edges being horizontal.

In this position, the entire length of U-shaped rod 15 has come to rest flatly on cradle 11 and is firmly pressed down against it by the weight of the loaded wheel. Being connected to ramp 12 through bushings 16, U-shaped rod 15, now under pressure of the wheel, locks ramp 12 in a fixed, erect position, thus preventing it from switching loosely back and forth as the flat tire tends to move within the cradle.

Besides the afore-mentioned function of locking ramp 12 in place, U-shaped rod 15 fulfills a second, more important objective, to be described hereinbelow.

When the truck is not in use, ramp 12 may be pivoted into the storage position shown in FIG. 1, in which upper ramp surface 14 faces downwardly toward cradle 11. This is the most compact configuration of the truck, and permits it to be stowed conveniently in the truck of even a subcompact size car.

Since weight is an important factor to be considered in terms of both economy of manufacture and convenience of use, the ramp member, which is the heaviest single part of the truck, may be made of perforated metal. For the truck as a whole, magnesium, magnesium steel or 1" cold rolled steel is recommended, the choice being dependent mainly on cost considerations.

It will be noted, particularly from FIG. 3, that the leading corners 13b of side walls 13 of ramp 12 which contact the ground in the loading position are located ahead of the vertical plane through the axle of the rear wheels. As the center of gravity of the wheel being mounted shifts through this vertical plane, its weight is brought to bear on the leading portion of ramp 12, thereby causing the latter to pivot upwardly as mentioned above. Distance A between corners 13b and said vertical plane is critical to assure that this pivoting motion takes place only after the wheel has passed the axle of rear wheels 3 and not before. Otherwise, premature pivoting of the ramp would cause rear wheels 3 to contact the ground too soon, causing the truck to slide forward before receiving the load. This is what happens in U.S. Pat. No. 2,198,438 (Knapp) where the leading edge of the ground-contacting side of block 7 is located to the rear of axle 5 of rear wheels 4 (vide FIG. 3 of the patent). From the drawing itself it can be anticipated that the rear wheels of the truck will touch the ground before the flat tire is loaded in the cradle, premature sliding of the truck thus being inevitable.

Inasmuch as the truck according to the present invention is to be usable with a damaged or flat *rear* vehicle wheel, it is necessary for it to be low enough to be slid in position ahead of such wheel, regardless of the amount of clearance available underneath the car side. On the other hand, once the damaged wheel is in place on the truck, it must be retained securely by a frontal abutment of a height sufficient to prevent the wheel—and particularly a drive wheel—from jumping the truck as it encounters an irregularity in the road surface.

Applicant has met these two contradictory requirements by the provision of *collapsible* abutment or barrier 10, located at the front end of the truck, which extends horizontally in or below the plane of the frame when the truck is being placed underneath the car, but raises itself automatically when the clearance increases by the mounting of the wheel.

The mechanism that makes this automatic operation possible consists of three separate but interacting pieces:

The first of these pieces is U-shaped rod 15, which has already been described. When a wheel is mounted, upward pivoting of ramp 12 causes its leading edge to move forwardly, carrying with it U-shaped rod 15.

As the closed end of U-shaped rod 15 moves forward on cradle 11, it contacts the rear end of the second piece of the mechanism, a V-shaped rod 18 whose rear arm extends horizontally longitudinally along the central axis of cradle 11 and is retained by a semi-circular guide 19, integral with the cradle. The front arm of V-shaped rod 18 inclines forwardly upwardly from the rear arm and is integral at its front end with a circular housing 20 which surrounds a rod 21 connecting the legs of the third piece of the mechanism, U-shaped tubular member 10.

Welded at the ends of tubular member 10 are two bushings 17 which surround crosspiece 9 about which U-shaped member 10 rotates from a downward, generally horizontal position to an upward, vertical position.

Thus, as U-shaped member 15 continues its forward movement, it pushes V-shaped rod 18 forward against rod member 21 integral with U-shaped tubular member 10, which is then forced to rotate upwards about crosspiece 9 until it reaches a vertical position, at which point its further progress is arrested by a detent 22 integral with plate 8.

The result is that U-shaped member 10 is now in position to firmly restrain the wheel located in cradle 11 against forward movement, having been raised to such restraining position only after the truck was slid beneath the car.

In case the driver wishes to dismount the wheel before he reaches a service station, he must block rear wheels 3 against rearward movement and simply shift the vehicle into reverse gear. Alternatively, when dismounting is accomplished at a garage or service station, a conventional jack can be used.

The collapsible barrier 10 solves the problem of how to build a truck low enough to be slid under the side of a car having low ground clearance, yet high enough at its leading end to prevent the wheel from jumping the truck when it hits an obstacle.

For this purpose, Graves U.S. Pat. No. 3,145,860, for instance, provides an arrangement of lateral holding bars, chains, springs and locking pins which is costly and complex. Similarly, Knapp U.S. Pat. No. 2,198,438 provides a relatively low, fixed barrier (still too high for some vehicles) but incorporates in it a series of rollers which are intended to force the wheel to skid instead of jumping over the rollers, but in practice fail to accomplish that, apart from also being costly and heavy.

The collapsible barrier 10 according to the present invention does away with the entire problem by means of an extremely simple, inexpensive mechanism, described hereinabove, which assures firm retention of the mounted wheel, can be inserted with minimal clearance underneath any car side and does not require personal, time-consuming intervention of the driver for mechanical adjustments after the wheel is mounted, the entire operation of unloading the truck, placing it in front of the flat tire and resuming travel requiring no more than a minute or two.

What is claimed is:

1. A wheeled support device for the disabled tire of a vehicle, comprising
   (a) a generally U-shaped tubular frame having substantially parallel side members;
   (b) a front wheel mounted for pivoting movement centrally between the forward portions of said side members;
   (c) at least two rear wheels mounted on an axle extending transversely between the rear portions of said side members;
   (d) a substantially U-shaped cradle extending between said side members with its open end facing upwardly and having a width sufficient to receive a tire to be mounted on said support device, each of the arms of the U depending downwardly from a respective one of said side members;
   (e) a ramp member mounted upon said axle mounting said rear wheels and pivotable about said axle from a first position in which it presents a rearwardly downwardly inclined surface adapted to receive a tire to be mounted on said support device to a second position in which said surface extends in a generally vertical direction for retaining said tire in its mounted position, to a third position in which said surface faces downwardly toward said cradle;
   (f) said ramp member having substantially vertical, generally triangular side walls one of whose sides abuts the ground when said ramp member is in its said first position, the vertical distance of said ground abutting side from said axle being greater than the radius of said rear wheels, whereby said rear wheels are out of contact with the ground when said ramp is in its said first position;
   (g) a forward restraining member mounted for movement about a pivot member from a first position in which it extends in a rearward, generally horizontal direction in the plane of said frame to a second position in which it extends in a direction within the range of 45° to 90° from a horizontal plane extending rearwardly from said pivot member above said plane, for retaining said tire in its mounted position; and
   (h) means actuated by movement of said ramp member from its said first position to its said second position for moving said forward restraining member from its said first position to its said second position, said means comprising an abutment member pivotally attached adjacent the leading edge of said surface of said ramp member for forward movement therewith, and a longitudinally extending crank member having one of its ends attached to the pivot axis of said forward restraining member, the other of its ends being abutted by said abutment member as it moves with said ramp member from its said first position to its said second position.

2. A wheeled support device according to claim 1, wherein the leading edge of said ground abutting side of said ramp member when in its said first position is forward of the vertical plane through the axle mounting said rear wheels and said ramp member, whereby, upon movement of the tire being mounted past said vertical plane, pivoting movement of said ramp member about said axle is facilitated, causing said rear wheels to be lowered into contact with the ground.

3. A wheeled support device according to claim 1, wherein said cradle is a solid metallic unit.

4. A wheeled support device according to claim 1, wherein said cradle comprises a series of parallel metallic ribs.

5. A wheeled support device according to claim 1, wherein said ramp member is a solid metallic unit.

6. A wheeled support device according to claim 1, wherein said ramp member is a perforated metallic unit.

7. A wheeled support device according to claim 1, made of magnesium.

8. A wheeled support device according to claim 1, made of one-inch cold rolled steel.

9. A wheeled support device according to claim 1, wherein said surface of said ramp member is provided with a friction producing coating.

10. In a support device for the disabled tire of a vehicle comprising a horizontally extending, generally U-shaped frame having substantially parallel side members, front and rear wheels and a substantially U-shaped cradle extending between said side members and between said front and rear wheels and having a width sufficient to receive a tire to be mounted on said support device, the improvement comprising a restraining member mounted forwardly of said cradle for movement about a pivot member from a first position in which it extends in a rearward, generally horizontal direction, to a second position in which it extends in a direction within the range of 45° and 90° from a horizontal plane extending rearwardly from said pivot member above said cradle, for retaining said tire in its mounted position against forward movement out of said cradle.

11. A wheeled support device according to claim 10, including detent means positioned forwardly of said restraining member for abutment against an element integral with said forward restraining member for limiting movement thereof beyond its said second position.

* * * * *